United States Patent
Vidya et al.

(10) Patent No.: US 8,196,211 B2
(45) Date of Patent: Jun. 5, 2012

(54) AUTHORIZED AUTHORIZATION SET IN RBAC MODEL

(75) Inventors: Ranganathan Vidya, Bangalore (IN);
Murali Vaddagiri, Bangalore (IN); Ravi A Shankar, Austin, TX (US); Saurabh Desai, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 12/191,644

(22) Filed: Aug. 14, 2008

(65) Prior Publication Data

US 2010/0043069 A1 Feb. 18, 2010

(51) Int. Cl.
*G06F 21/00* (2006.01)
(52) U.S. Cl. .......................................... 726/26; 726/21
(58) Field of Classification Search ................ 726/1–10, 726/21, 26
See application file for complete search history.

(56) References Cited

U.S. PATENT DOCUMENTS

| 6,023,765 | A | 2/2000 | Kuhn et al. |
| 6,574,736 | B1 | 6/2003 | Andrews et al. |
| 7,062,770 | B2 | 6/2003 | Limprecht et al. |
| 2002/0026592 | A1 | 2/2002 | Gavrila et al. |
| 2007/0240231 | A1 | 10/2007 | Haswarey et al. |
| 2009/0328129 | A1* | 12/2009 | Desai et al. .................. 726/1 |

FOREIGN PATENT DOCUMENTS

JP 63073336 A * 4/1988

* cited by examiner

*Primary Examiner* — Nasser Goodarzi
*Assistant Examiner* — Lisa Lewis
(74) *Attorney, Agent, or Firm* — Yee & Associates, P.C.; David A. Mims, Jr.

(57) ABSTRACT

The Authorized Authorization Set System comprising a modified operating system, a command table containing authorized authorization sets, and a modified RBAC security system, eliminates the need for inherited privileges that must be passed to subcommands in order for the command to run. The modified operating system accesses a table containing authorized authorization sets which identify the privileges for all subcommands within a command. When a user is assigned an accessauth for a command, and a sub-command is a privileged sub-command, the privileged sub-command is only run when the accessauth of the sub-command is included in the authorized authorization set of the command.

3 Claims, 2 Drawing Sheets

AUTHORIZED AUTHORIZATION SET IN RBAC MODEL

This invention was made with Government support under PERCS PHASE III, HR0011-07-9-0002. THE GOVERNMENT HAS CERTAIN RIGHTS IN THIS INVENTION.

FIELD OF THE INVENTION

The invention relates generally to security system for a computer system, and specifically to using a command table, a modified operating system, and a modified Role Base Access Control (RBAC) system to only allow sub-commands to be run in accordance with authorizations in the command table.

BACKGROUND OF THE INVENTION

A system administrator controls a user's access to the resources of a computer system by assigning access rights to the user in a security system. One such system is a Role-Based Access Control (RBAC) system. The RBAC uses authorizations, roles, and privileges to grant rights according to different levels of functionality for different classes of users. Roles are a set of functions unique to a particular class of users of the computer system, and multiple authorizations may be assigned to a role in order to allow users under that role to perform the requisite functions unique to the particular class of users. Privileges are a part of the RBAC system that provide fine granular control of the system functions. A user acquires privileges based on authorizations granted to their role. Regular users are allowed access to various functions when they have relevant privileges. Privileges are typically mapped to bit masks and are used in the kernel space of the operating system to achieve privileged function specific security controls.

A problem arises in the RBAC system in regard to assignment of privileges. In an RBAC system, a user runs a command that has various sub-commands in which some of the sub-commands are ordinary commands while others are privileged sub-commands. For a user to run the command, the user's role must have an authorization. When the user is authorized to run the command, the operating system will assign the command with all the privileges required for running each privileged sub-command within the command. For example, one possible RBAC system of authorizations and privileges is shown below:

```
cmdA:
        accessauths = AuthABC
        innateprivs = privread, privexecute
        inheritprivs = priv1, priv2
cmd1:
        accessauths = auth1
        innateprivs = priv1
cmd2:
        accessauths = auth2
        innateprivs = priv2
```

As used herein command shall have the same meaning as process, program, shell script, or parent, and sub-command shall have the same meaning as sub-process, sub-program, script, or child.

Referring to the above example, cmdA requires an access authorization, AuthABC, to be assigned to the user in order for the operating system to run the command. Additionally, cmdA also requires that the privileges, innateprivs and inheritprivs, be assigned to the user so that the sub-commands can be run. Innate privileges are privileges assigned to the command when the operating system determines that the command has the proper authorization. Inherit privileges are privileges that a command passes on to its sub-commands.

In general, various commands run through multiple sub-commands for sequential execution. The sub-commands may be either ordinary commands or privileged commands. Ordinary sub-commands do not require any authorization in order to execute, while privileged sub-commands require that the user be authorized to execute each of the privileged subcommands. In an RBAC system, the command gains all of the accumulated authorizations needed to run each of the sequentially executed privileged sub-commands Thus, when an authorization is assigned to a role, and correspondingly to the users associated with that role, those users are free to use the authorization from any context. In other words, a user with an authorization to execute a privileged sub-command could use the sub-command from any command, or directly from the command line. An sub-command executed by an authorized user run with privileges throughout its lifetime creates a security risk. Therefore, a need exists for a way to eliminate this security risk by restricting the execution of privileged sub-commands only in the context of the execution of the sub-command and only during the time the command actually runs the sub-command.

BRIEF SUMMARY OF THE INVENTION

The Authorized Authorization Set System comprising a modified operating system, a command table containing authorized authorization sets, and a modified RBAC security system, eliminates the need for inherited privileges that must be passed to subcommands in order for the command to run. The modified operating system accesses a table containing authorized authorization sets which identify the privileges for all subcommands within a command. The operating system assigns authorized authorizations to the process. When the process starts executing, it will be able to execute the sub-commands as the corresponding authorizations required to execute them have been assigned in the authorized authorization set of the process. Since no inherited privileges are assigned, a user cannot gain access to a subcommand in any other context or at any other time. Therefore, the Authorized Authorization Set System only executes privileged sub-commands in the context of the execution of the sub-command and only during the time the command actually runs the sub-command.

BRIEF DESCRIPTION OF THE DRAWINGS

The novel features believed characteristic of the invention are set forth in the appended claims. The invention itself, as well as a preferred mode of use, further objectives, and advantages thereof, will be understood best by reference to the following detailed description of an illustrative embodiment when read in conjunction with the accompanying drawings, wherein:

DETAILED DESCRIPTION

Figure 1:
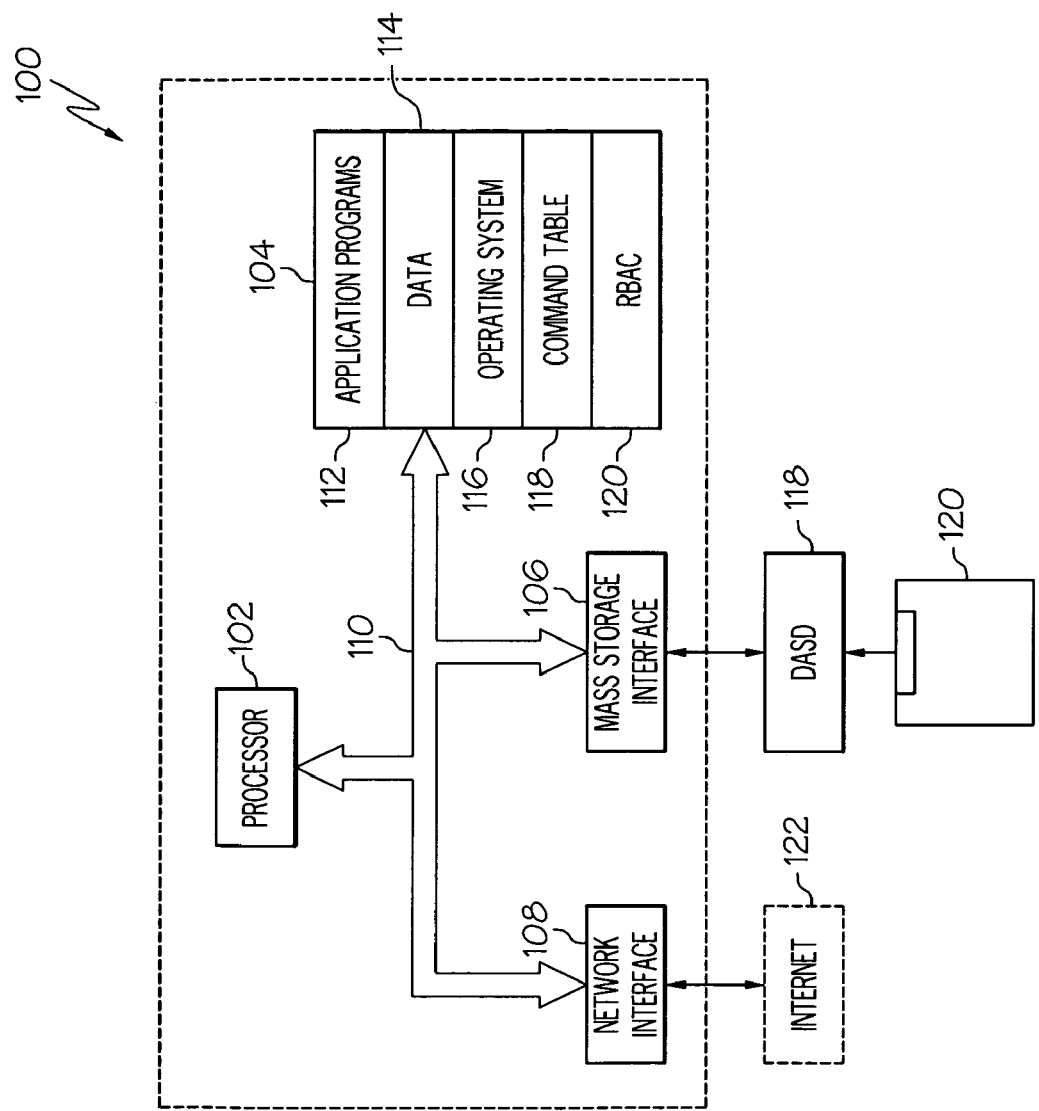
FIG. 1 is a block diagram of an apparatus for providing access control in accordance with an embodiment of the present invention.

FIG. 1 is a block diagram of an apparatus for providing access control in accordance with an embodiment of the present invention. Computer system 100 includes processor 102, main memory 104, mass storage interface 106, and network interface 108, all inter-connected by system bus 110. Those skilled in the art will appreciate that this system encompasses all types of computer systems: personal computers, midrange computers, and mainframes, and that many additions, modifications, and deletions can be made to this computer system 100. For example, computer system 100 may include a display, a keyboard, a cache memory, and peripheral devices such as printers (not shown).

Processor 102 that can be constructed from one or more microprocessors and/or integrated circuits. Processor 102 executes program instructions stored in main memory 104. Main memory 104 stores programs and data that computer system 100 may access to perform commands and sub-commands as explained in conjunction with FIG. 2. Further, a programmable hardware executes these program instructions. The programmable hardware may include, without limitation hardware that executes software based program instructions such as processor 102. The programmable hardware may also include hardware where program instructions are embodied in the hardware itself such as Field Programmable Gate Array (FPGA), Application Specific Integrated Circuit (ASIC) or any combination thereof.

Main memory 104 includes one or more application programs 112, data 114, operating system 116, command table 118, and RBAC 120. When computer system 100 starts, processor 102 initially executes the program instructions that make up operating system 116. Operating system 116 is a sophisticated program that manages the resources of computer system 100 for example, processor 102, main memory 104, mass storage interface 106, network interface 108, and system bus 110.

Processor 102 under the control of operating system 116 executes application programs 112. Application programs 112 can be run with program data 114 as input. Application programs 112 can also output their results as program data 114 in main memory 104.

Mass storage interface 106 allows computer system 100 to retrieve and store data from auxiliary storage devices such as magnetic disks (hard disks, diskettes) and optical disks (CD-ROM). These mass storage devices are commonly known as Direct Access Storage Devices (DASD) 118, and act as a permanent store of information. One suitable type of DASD 118 is floppy disk drive that reads data from and writes data to floppy diskette 120. The information from DASD 118 can be in many forms. Common forms are application programs and program data. Data retrieved through mass storage interface 106 is usually placed in main memory 104 where processor 102 can process it.

While main memory 104 and DASD 118 are typically separate storage devices, computer system 100 uses well known virtual addressing mechanisms that allow the programs of computer system 100 to run smoothly as if having access to a large, single storage entity, instead of access to multiple, smaller storage entities (e.g., main memory 104 and DASD 118). Therefore, while certain elements are shown to reside in main memory 104, those skilled in the art will recognize that these are not necessarily all completely contained in main memory 104 at the same time. It should be noted that the term "memory" is used herein to generically refer to the entire virtual memory of computer system 100. In addition, an apparatus in accordance with the present invention includes any possible configuration of hardware and software that contains the elements of the invention, whether the apparatus is a single computer system or is comprised of multiple computer systems operating in concert.

FIG. 1 further depicts network interface 108 that allows computer system 100 to send and receive data to and from any network connected to computer system 100. This network may be a local area network (LAN), a wide area network (WAN), or more specifically Internet 122. Suitable methods of connecting to a network include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

FIG. 1 further depicts system bus 110 that allows data to be transferred among the various components of computer system 100. Although computer system 100 is shown to contain only a single main processor and a single system bus, those skilled in the art will appreciate that the present invention may be practiced using a computer system that has multiple processors and/or multiple buses. In addition, the interfaces that are used in the preferred embodiment of the present invention may include separate, fully programmed microprocessors that are used to off-load compute-intensive processing from processor 102, or may include I/O adapters to perform similar functions.

In a UNIX™ based operating system, a command can be written for any purpose. For example, the command, cmd A, has an authorized authorization set (AAS) associated with it. As used herein authorized authorization set (AAS) means a plurality of authorizations entered by a system administrator into a command table accessible by an operating system The command can be represented as:

```
cmdA:
        accessauths = AuthABC
        innateprivs = privread, privexecute
        AAS = auth1, auth2, auth3
cmd1:
        accessauths = auth1
        innateprivs = priv1
cmd2:
        accessauths = auth2
        innateprivs = priv2
cmd3:
        accessauths = auth3
        innateprivs = priv3
```

As represented above, the AAS has three authorizations auth1, auth2, and auth3 corresponding to the three privileged commands: cmd1, cmd2, and cmd3 respectively. The AAS is entered into the command table by the system administrator. Access to the command is governed by the modified RBAC system that does not contain inherited privileges. The operating system determines that a user's role has the proper accessauth in order to run the command in accordance with the RBAC system. Innate privileges are assigned in accordance with the modified RBAC system. After that, the modified operating system controls access in accordance with the command table containing the AAS for the command and the authorizations for each sub-command.

In this example, in accordance with the AAS in the command table, cmdA will be assigned with all authorizations specified in the AAS. When cmdA executes cmd1, the AAS will be checked and if auth1 access is allowed to all privileges (priv1 from innateprivs) are assigned to cmd1. In this way the user's role need not have all the authorizations required to execute the privileged sub-commands in the command. Additional authorizations in the command table can be granted based on an initial AccessAuths verification.

Subsequently the operating system checks if the AAS provides an authorization for executing the next privileged command. For example, when accessauths=auth2, is the authorization required to execute the privileged command /usr/sbin/cmd2, then the operating system checks the command table and determines that the authorization auth2 and privileges represented by innateprivs are granted to the cmd2 and the operating system executes cmd2. Since the command table is checked before running cmd2, and no authorizations are granted to the user, execution of the privilege command takes place one time and the privileged command is restricted for execution only from within cmdA and only during the execution of the privileged command. Consequently, these privileges cannot be used to run any other privileged command even from within the executable.

Figure 2:
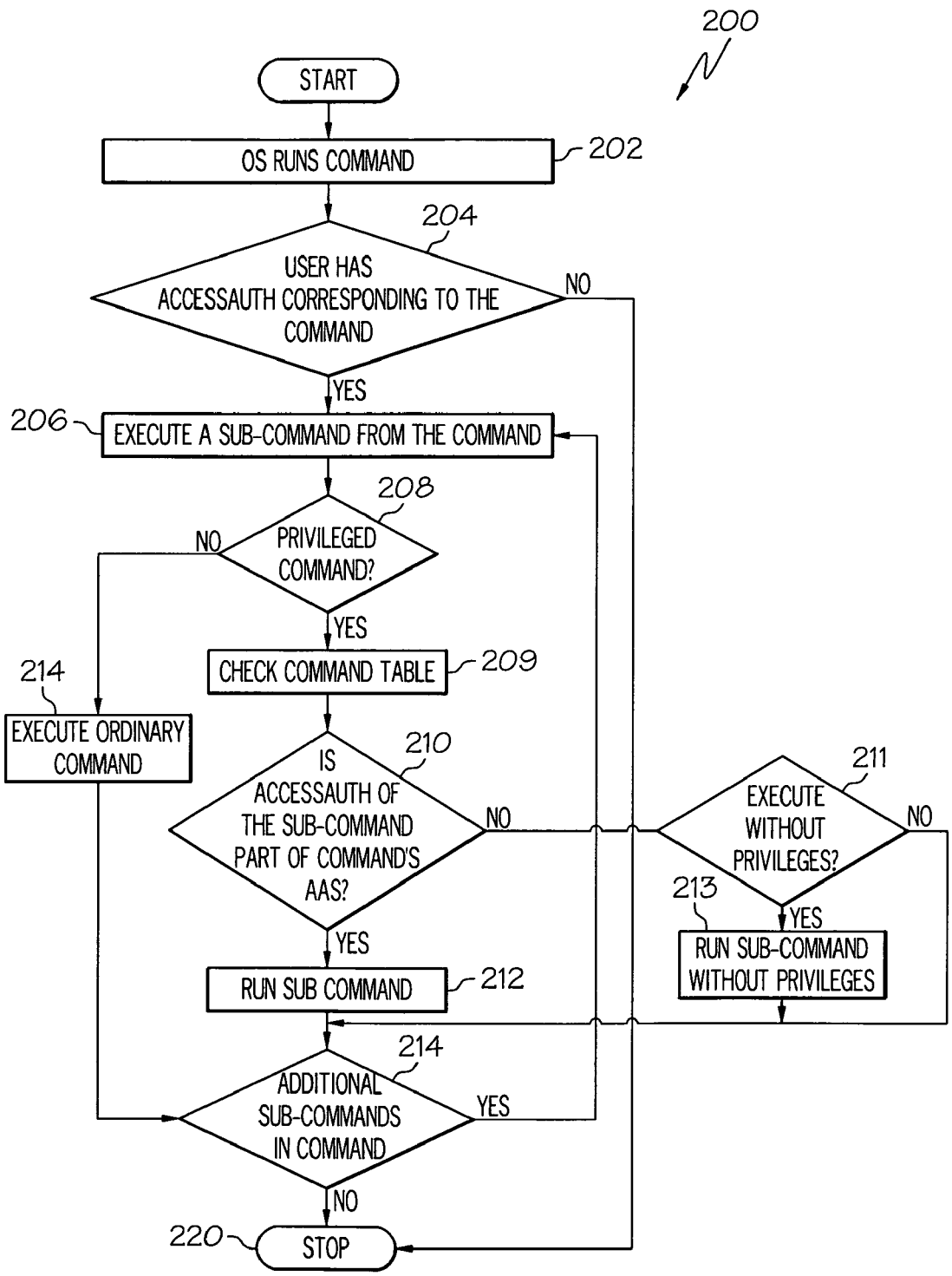
FIG. 2 is a flowchart depicting a process for providing access control in accordance with another embodiment of the present invention.

FIG. 2 is a flowchart for Authorized Authorization Set System 200. At step (202) a command is run. The command includes one or more privileged sub-commands and one or more ordinary sub-commands. An AAS corresponding to the command is in the command table and defines an authorization corresponding to each privileged sub-command included in the command. At step (204) the operating system determines if the user's role is assigned with the accessauth corresponding to the command. If the user's role is assigned with the accessauth corresponding to the command, then the operating system assigns the corresponding AAS to the command. The command then starts executing a sub-command (206, and the operating system determines if the sub-command is a privileged command (208). When the sub-command is a privileged sub-command, the operating system checks the command table (209) and determines if accessauth of the sub-command is part of the command's AAS in the command table (210). If so, the operating system runs the sub-command (212) If not, the operating system determines whether to execute the sub-command without privileges (211). If so, the sub-command is run without privileges. If not, AASS 200 goes to step 214. At step 214, the operating system determines if there are any additional sub-commands left in the command for execution. In case there are additional sub-commands, the operating system reads the next sub-command (206).

When the operating system detects an ordinary command (208) the operating system executes the ordinary command (214). When the operating system determines that there are no additional sub-commands to be executed, the command stops (212). The system administrator may modify the authorizations defined by AAS in command table.

The Authorized Authorization Set System may take the form of an entirely hardware embodiment, an entirely software embodiment or an embodiment containing both hardware and software elements. In accordance with an embodiment of the present invention, the invention is implemented in software, which includes, but is not limited to firmware, resident software, microcode, etc.

Furthermore, the Authorized Authorization Set System may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus or device.

The afore-mentioned medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W), DVD and blu-ray disk.

In the aforesaid description, specific embodiments of the present invention have been described by way of examples with reference to the accompanying figures and drawings. One of ordinary skill in the art will appreciate that various modifications and changes can be made to the embodiments without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A computer implemented process for eliminating inherited privileges in a role based access control system control comprising:
    modifying an operating system to access a command a table and to only run a sub-command when an appropriate authorization is in the command table;
    modifying the role based access control system to eliminate inherited privileges;
    entering a plurality of authorized access sets into the command table, the plurality of authorized authorization sets comprising a set of authorizations, each authorization corresponding to a privileged sub-command within a command;
    responsive to receiving a request from a user to run a command, determining if the user is assigned an accessauth for the command;
    responsive to determining that the user is assigned an accessauth for the command, determining if a sub-command is a privileged sub-command, and responsive to determining that the sub-command is a privileged sub-command, accessing the command table;
    responsive to accessing the command table, determining if the accessauth of the sub-command is included in an authorized authorization set of the command; and
    when the accessauth of the sub-command is included in the authorized authorization set of the command, running the privileged sub-command;
    whereby a privileged sub-command is run only when the command is run and cannot be run by the user in any other context or at any other time.

2. A programmable apparatus for providing access control comprising:
    a programmable hardware connected to a memory;
    a program stored in the memory;
    wherein the program directs the programmable hardware to perform the following series of steps:
    modifying an operating system to access a command a table and to only run a sub-command when an appropriate authorization is in the command table;
    modifying the role based access control system to eliminate inherited privileges;
    entering a plurality of authorized access sets into the command table, the plurality of authorized authorization sets comprising a set of authorizations, each authorization corresponding to a privileged sub-command within a command;

responsive to receiving a request from a user to run a command, determining if the user is assigned an accessauth for the command;

responsive to determining that the user is assigned an accessauth for the command, determining if a sub-command is a privileged sub-command, and responsive to determining that the sub-command is a privileged sub-command, accessing the command table;

responsive to accessing the command table, determining if the accessauth of the sub-command is included in an authorized authorization set of the command; and when the accessauth of the sub-command is included in the authorized authorization set of the command, running the privileged sub-command;

whereby a privileged sub-command is run only when the command is run and cannot be run by the user in any other context or at any other time.

3. A non-transitory computer program product for causing a computer to provide an access control comprising:

a computer readable storage medium;

a program stored in the computer readable storage medium;

wherein the computer readable storage medium, so configured by the program, causes a computer to perform the following series of steps:

modifying an operating system to access a command a table and to only run a sub-command when an appropriate authorization is in the command table;

modifying the role based access control system to eliminate inherited privileges;

entering a plurality of authorized access sets into the command table, the plurality of authorized authorization sets comprising a set of authorizations, each authorization corresponding to a privileged sub-command within a command;

responsive to receiving a request from a user to run a command, determining if the user is assigned an accessauth for the command;

responsive to determining that the user is assigned an accessauth for the command, determining if a sub-command is a privileged sub-command, and responsive to determining that the sub-command is a privileged sub-command, accessing the command table;

responsive to accessing the command table, determining if the accessauth of the sub-command is included in an authorized authorization set of the command; and when the accessauth of the sub-command is included in the authorized authorization set of the command, running the privileged sub-command;

whereby a privileged sub-command is run only when the command is run and cannot be run by the user in any other context or at any other time.

* * * * *